Sept. 19, 1933. F. M. STEVENS ET AL 1,927,721
CLEANER AND POLISHER
Filed July 12, 1929 3 Sheets-Sheet 2
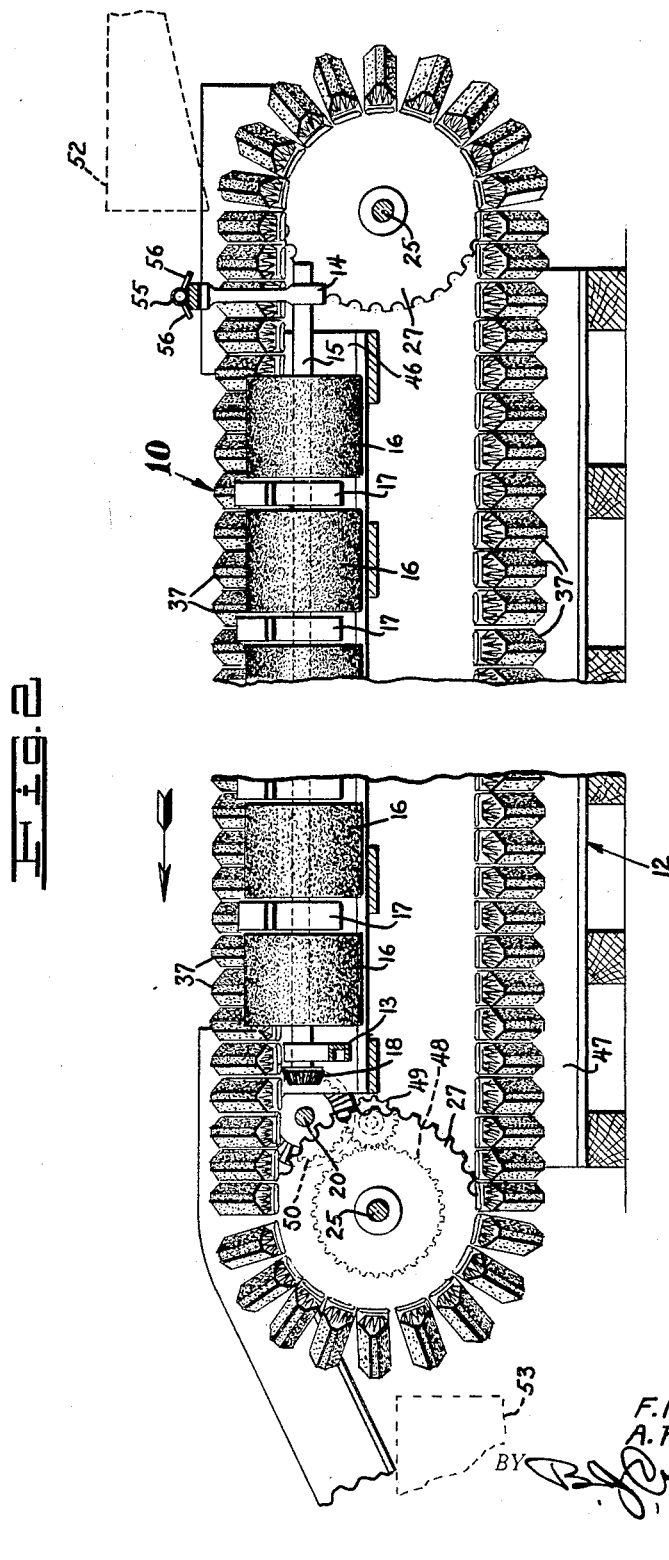
INVENTORS.
F. M. STEVENS
A. R. STEVENS
BY
ATTORNEY.

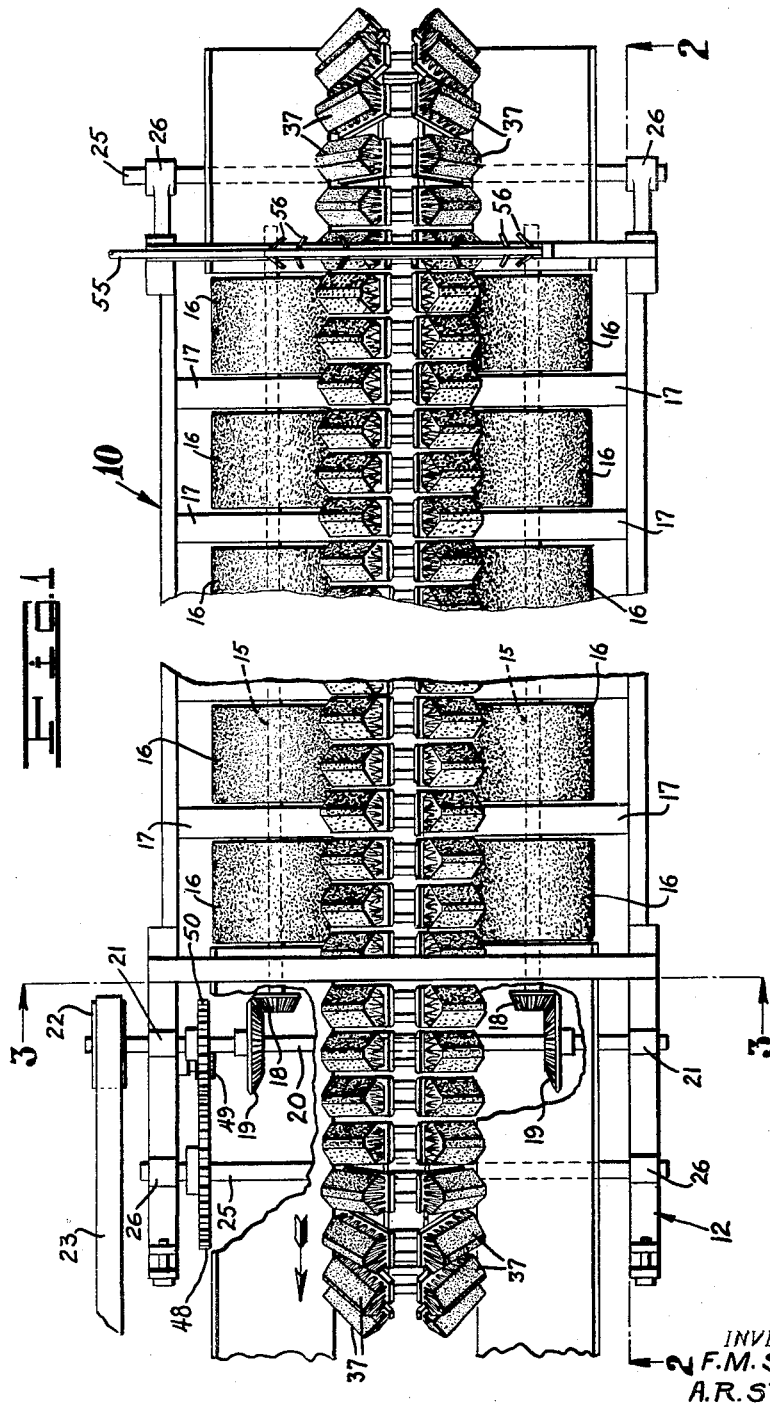

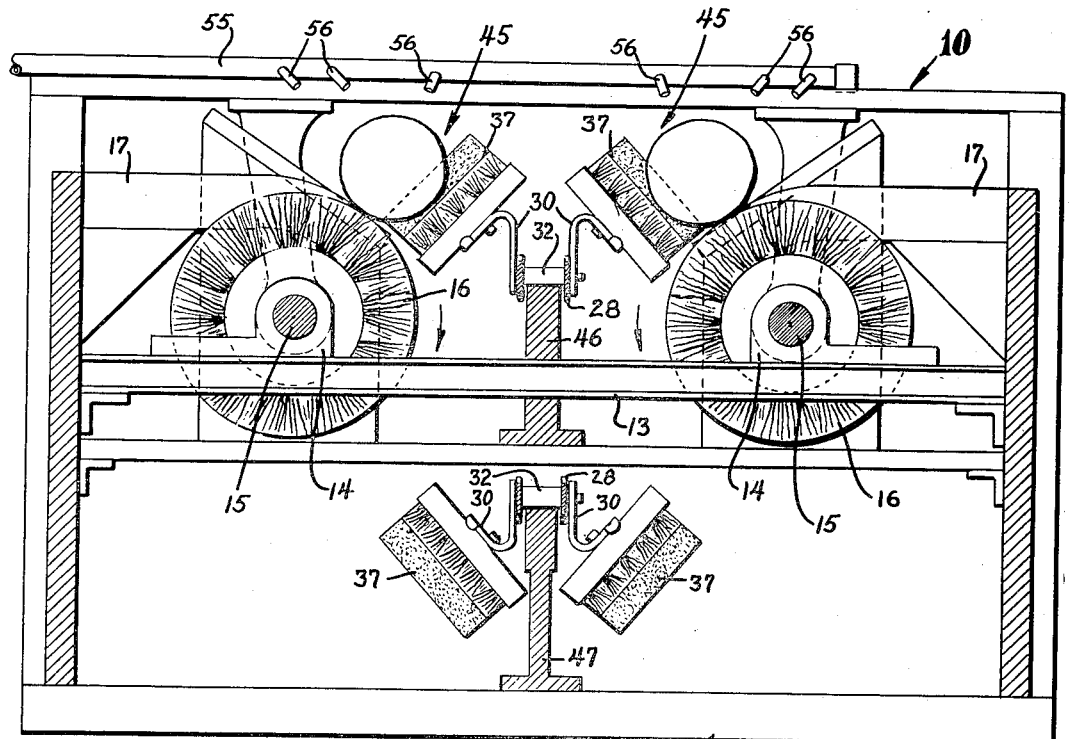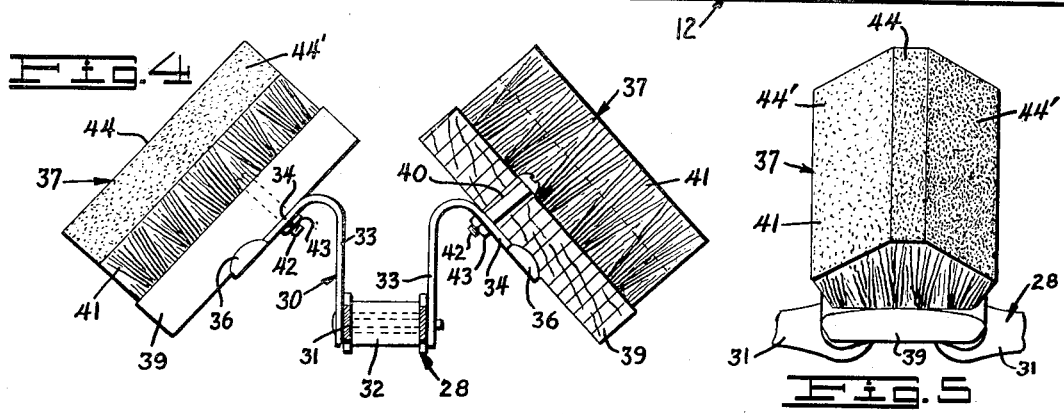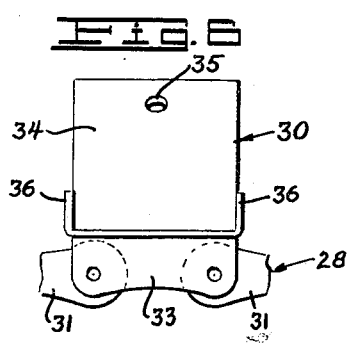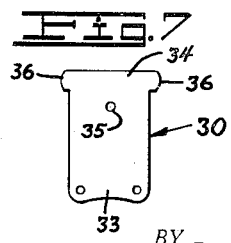

Patented Sept. 19, 1933

1,927,721

UNITED STATES PATENT OFFICE 1,927,721

CLEANER AND POLISHER

Frank M. Stevens and Augustus R. Stevens, Lindsay, Calif., assignors to Food Machinery Corporation, San Jose, Calif., a corporation of Delaware Application July 12, 1929. Serial No. 377,697

9 Claims. (Cl. 146—202)

This invention relates to improvements in cleaning devices.

The general object of this invention is to provide an improved device for removing dirt, dust and other foreign matter from the skins of fruit and more particularly for fruit such as oranges, lemons, grapefruit and the like.

Another object of the invention is to provide a device of the class described wherein a novel means for conveying the fruit from the loading to the discharge end of the device is provided.

A further object of the invention is to provide a fruit cleaning device having a novel conveyor which includes means to assist in the cleaning of the fruit.

A still further object of the invention is to provide a conveyor including brushes which are so arranged that they cause positive turning of the fruit on the conveyor as it passes through the device to thereby clean the entire surface of the fruit.

Another object of the invention is to provide a device of the class described wherein a series of rotating brushes and a series of movable brushes are employed.

A further object of the invention is to provide a cleaner having an arrangement of brushes in inverted V formation with rotatable brushes disposed adjacent thereto.

Another object of the invention is to provide a conveyor wherein an endless belt has brushes thereon which are so shaped as to present a serrated surface for engaging the fruit.

Other objects and the advantages of this invention will be apparent from the following description taken in connection with the accompanying drawings wherein:

Fig. 1 is a top plan view illustrating our improved cleaning device.

Fig. 2 is a longitudinal section taken on line 2—2 of Fig. 1.

Fig. 3 is an enlarged fragmentary section taken on line 3—3 of Fig. 1.

Fig. 4 is an enlarged view of an opposed pair of brushes, their supporting brackets and a link of the conveyor chain.

Fig. 5 is a side view of the parts shown in Fig. 4.

Fig. 6 is an enlarged face view of one of the brush brackets and

Fig. 7 is a plan of the bracket blank.

Referring to the drawings by reference characters we have shown our invention embodied in a cleaning device indicated generally at 10. As shown the general arrangement and construction of the present device is similar to that shown in the prior patent of A. R. Stevens, No. 1,513,195, issued October 28, 1924, over which the present invention is an improvement.

The device 10 comprises a suitable framework 12 having cross members 13 to which bearings 14 for parallel, transversely spaced, longitudinal shafts 15 are secured. On the shafts 15 we provide a plurality of brushes 16 which are arranged with a fixed member 17 between each of the brushes as shown in the drawings. These members 17 having a surface in alignment with that of the brushes cause the fruit when it strikes a member 17 to shift its axis of rotation so that all peripheral zones of the fruit will be brushed.

Adjacent each end of the device we provide a transverse shaft 25 which are shown as supported in bearings 26 and on each of the shafts 25 we secure a sprocket 27. Positioned on the sprockets 27 we provide an endless chain 28 which includes a plurality of opposed sets of brackets 30 and intervening links 31 connected by any suitable type of transverse member 32. Each of the brackets 30 includes a vertical portion 33 which is secured to the links 31. Each bracket also includes an inclined bed 34 having an aperture 35 therein and having a pair of upstruck ears 36 thereon adjacent the free end. When the brackets 30 are assembled with the chain the inclined beds of each opposed pair are inclined downwardly and outwardly as clearly shown in Figs. 3 and 4. Each bracket may be made from a blank as shown in Fig. 7.

On the inclined beds 34 of each of the brackets 30 we secure a brush such as indicated generally at 37 and which includes a back 39 having an aperture 40 therein and having bristles 41. The brush 37 is adapted to be secured to the plate 34 by a screw 42 which is positioned in the brush aperture 40 and extends through the plate 34 where it receives a nut 43. The screw 42 prevents the brush from becoming disengaged from the bracket while the upstruck ears 36 prevent the brush from turning about the axis of the screw 42.

The upper face of the bristles 41 of each brush are shown as arranged with a flat center portion 44 and inclined sides 44' so that when the brushes are assembled on the chain the upper surfaces of the brushes present a serrated face which is inclined downwardly towards the rotating brushes 16 on the corresponding side on the working reach of the endless chain. The brushes 37 in conjunction with the brushes 16 thus form two channelways 45 in which the fruit is conveyed through the device as shown in Fig. 3.

For supporting the upper or working reach of the endless chain 28 we may provide a track 46 and for supporting the lower reach of the chain we may provide another track 47. The cross members 32 of the chain (which may comprise rollers if desired) are adapted to engage the upper faces of the tracks 46 and 47 and ride thereon thus preventing sagging of the chain on both reaches thereof.

For driving the endless chain we show on one of the shafts 25 a gear 48 which meshes with an idler gear 49 which in turn meshes with a gear 50 on the shaft 20.

Any suitable means may be used for loading the fruit onto the traveling brushes such as a delivery device or chute as indicated at 52 in Fig. 2 and the traveling brushes may discharge the fruit into a hopper, a conveyor or other receiver as indicated at 53 in Fig. 2.

When the fruit is delivered from the chute 52 into the channelways 45 the traveling brushes 37 carry the fruit towards the discharge end of the device and as the fruit is thus moved the rotation of the brushes 16 tend to turn it about an axis parallel to their axis of rotation while the traveling movement of the brushes 37 tend to advance and also to turn the fruit about an axis at right angles to the axis of the brushes 16. The result is that the fruit is turned about constantly changed axes so that all zones of the fruit are brushed.

When the spacing members 17 are used they interrupt the movement of the fruit so that a further shifting of the axis of rotation results. Thus it will be seen that as the fruit is conveyed from the loading to the discharge end of the machine it is rotated about various axes which causes all parts of the fruit to engage the various brushes thereby thoroughly cleaning the skin of the fruit.

At times it may be desirable to moisten the fruit to assist in the removal of foreign matter from the skins thereof and for this purpose there is provided adjacent the loading end of the device a pipe 55 which may be connected to a suitable source of supply and includes a plurality of spray nozzles 56 which are positioned to direct a stream of fluid onto the fruit in the troughs 45 as clearly shown in Fig. 3.

From the foregoing description it will be apparent that we have provided a novel fruit cleaning device which is simple in construction and highly efficient in use.

Having thus described our invention, we claim:

1. In a device of the class described, a frame, a cylindrical brush member mounted for rotation thereon, a conveyor carried by said frame and having a reach thereof parallel to the longitudinal axis of said brush member, a plurality of brushes on said conveyor, said conveyor brushes being adjacent the periphery of said cylindrical brush members, one face of said conveyor brushes being inclined downward towards the longitudinal axis of said cylindrical brush member, said inclined face being serrated.

2. In a device of the class described, a frame, a pair of spaced cylindrical brush members mounted for rotation thereon, a conveyor on said frame positioned between said brush members and having a reach thereof parallel to the longitudinal axis of said cylindrical brush members, two sets of brushes associated with said conveyor, said sets being opposed with the faces of the brushes of one set inclined towards the longitudinal axis of one cylindrical brush member, and with the face of the brushes of the other set inclined towards the axis of the other cylindrical brush member, said inclined faces of said conveyor brushes being serrated.

3. In a brushing machine, a travelling brushing surface, and means for conveying articles longitudinally thereof and in brushing contact therewith comprising an endless series of brushes arranged in side by side relation and inclined downwardly towards said travelling brushing surface to form a brush runway, said brushes having their adjacent edges bevelled to form article conveying pockets.

4. In a brushing machine, a rotary cylindrical brush, and means for conveying articles longitudinally thereof and in brushing contact therewith comprising an endless series of brushes arranged in side by side relation and inclined downwardly towards said rotary brush to form a brush runway, said brushes having their adjacent edges bevelled to form article conveying pockets.

5. In a fruit cleaning machine a brushing device comprising an endless linked chain, toothed sprockets for supporting and driving the chain, a plurality of brush holding plates interposed in the chain to form links thereof, said plates extending upwardly from the chain and being reversely bent away from the chain to form inclined brush holding surfaces, and brushes secured to said surfaces.

6. In a fruit cleaning apparatus, a rotary cylindrical brushing element, an endless conveying and brushing device mounted to travel longitudinally of and parallel to said rotary brushing element and cooperating therewith to form a fruit brushing runway, said endless conveying device comprising a plurality of wedge shaped brushes inclined downwardly towards said rotary brushing element with the apexes of the wedges extending theretoward, said brushes being flexibly interconnected in series to form a serrated brushing surface, and means for driving said rotary element and said conveying device.

7. In a fruit cleaning apparatus a rotary cylindrical brushing element, an endless conveying and brushing device mounted to travel longitudinally of and parallel to said rotary brushing element and cooperating therewith to form a fruit brushing runway, said endless conveying device comprising a plurality of brushes flexibly connected together in series and inclined towards said rotary brushing element, said brushes being provided with serrations extending toward the rotary brushing element and forming fruit pockets, and means for driving said rotary element and said conveying device.

8. In a fruit brushing machine comprising a pair of brushing elements having their faces inclined toward each other to form a longitudinal brushing trough, one of said elements consisting of a series of brushes arranged side by side to form a conveyor with means for moving said series of brushes as a conveyor, the working faces of said series of brushes being inclined relative to each other to form short transverse V troughs lying at substantially right angles to the longitudinal trough and acting as means for conveying fruit along said longitudinal trough.

9. In a fruit brushing machine comprising a pair of brushing elements having their working faces inclined toward each other to form a longitudinal brushing trough, one of said elements consisting of an endless conveyor made up of a series of brushes arranged in side by side relation with means for moving said endless conveyor to convey fruit along said longitudinal trough, the working faces of said series of brushes being inclined relative to each other to form short transverse V troughs lying at substantially right angles to said longitudinal trough and acting to carry the fruit along said longitudinal trough.

FRANK M. STEVENS.
AUGUSTUS R. STEVENS.